United States Patent Office 3,160,205
Patented Dec. 8, 1964

3,160,205
SECONDARY RECOVERY WATER FLOODING PROCESS
Robert R. Harvey, Richard H. Langenheim, and Joseph C. Trantham, Bartlesville, Okla., assignors to Phillips Petroleum Company, a corporation of Delaware
No Drawing. Filed Feb. 26, 1963, Ser. No. 261,204
13 Claims. (Cl. 166—9)

This invention relates to the displacement of oil from subterranean formations by the use of driving liquids. In another aspect it relates to improved water flooding processes for recovery of oil.

It is well known that the so-called "primary" methods of recovering oil from subterranean formations through producing wells are quite inefficient. In general, it is estimated that no more than 20 to 30 percent of the original oil in a formation can be recovered by these methods. Various types of "secondary" recovery procedures have been developed in recent years to recover additional amounts of oil from the formations. Many of these secondary procedures involve displacing the oil by the use of a driving fluid which is injected into the formation through an input well. This driving fluid tends to displace the oil into an adjacent producing well from which it is recovered. However, even these secondary procedures fail to remove substantial volumes of oil originally in the formations.

It has recently been found that the efficiency of waterflooding operations can be increased by incorporating certain additives in the flood water. These additives render the oil sands more readily wettable by the water to provide more efficient displacement of the oil. A group of additives which has been found to be particularly useful for this purpose comprises quinones, quinhydrones and polyhydroxy aromatic materials which are capable of being converted to quinones. When using these additives, it is often desirable to incorporate certain reducing agents and bases in the flood water containing the additives. The resulting alkalinity permits improved adsorption and desorption of the additive on the oil sand, thereby enabling the additive to pass more quickly through the reservoir. However, the resulting pH may cause some of the flood water constituents to be precipitated by interaction with mineral salts dissolved in the connate water normally found in the oil producing formation. For example, magnesium and iron salts may react with hydroxide ions in the flood water to give precipitates of the resulting hydroxides. In addition, calcium and magnesium ions may tend to form insoluble salts when they react with the flood water additives. In either event, the desired additives are lost from the flood water and the resulting precipitates may tend to cause plugging problems in the formation.

In accordance with the present invention, improved waterflooding processes are provided which eliminate or minimize many of the problems previously encountered. This is accomplished by injecting selected materials before and after the flood water which contains a quinone, quinhydrone or a polyhydroxy aromatic substance capable of being converted to a quinone.

In one specific embodiment of this invention, a volume of relatively pure water is first injected into the formation. This is followed by a second volume of water which has a pH greater than seven. This second volume of water can contain selected reducing agents in addition to the alkaline material required to produce the desired pH. The third volume of water introduced into the formation also has a pH above 7 and contains the quinone, quinhydrone or polyhydroxy aromatic material, and may contain a selected reducing agent. A fourth volume of water is then introduced which has a composition similar to that of the second volume. This is followed by a fifth volume of substantially pure water. Thereafter, a conventional flood water is introduced to complete the waterflooding operation.

In another embodiment of this invention, the second and fourth volumes mentioned above are eliminated. In still another embodiment, the first and fifth volumes mentioned above are eliminated.

Accordingly, it is an object of this invention to provide an improved process for recovering oil from subterranean formations.

A further object is to provide novel procedures for increasing the efficiency of waterflooding processes.

Other objects, advantages and features of the invention should become apparent from the following detailed description.

As previously mentioned, the efficiency of a waterflooding process can be increased by incorporating certain additives into at least a part of the flood water. These additives include quinones, quinhydrones and polyhydroxy aromatic materials which are capable of being converted to quinones. The additives employed comprise one or more of the following groups of materials:

(A) 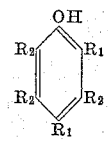

where $R_1$ and $R_2$ are selected from the group consisting of H, OH, R', COOH, $R_3$COOH, and $R_3$OH, at least one $R_1$ being OH, R' is an alkyl group having 1 to 4 carbon atoms per molecule, and $R_3$ is an alkylene group having 1 to 3 carbon atoms per molecule;

(B) 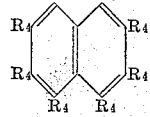

where $R_4$ is selected from the group consisting of H, OH, R', $R_3$OH, COOH, and $R_3$COOH, at least two $R_4$'s being OH and said structure being oxidizable to a quinone;
 (C) Flavotannins;
 (D) Gallotannins;
 (E) Mixed tannins;
 (F) Quinhydrone;
 (G) p-Benzoquinone;
 (H) 1-naphthol;
 (I) 1,3-naphthalenediol; and
 (J) Phloroglucinol and 2-methylphloroglucinol.

A wide variety of compounds within the foregoing groups are suitable for increasing the water wettability of the oil formation. Several examples of such compounds are set forth below.

Group (A): pyrocatechol, pyrogallol, gallic acid, hydroquinone, 1,2,4-benzenetriol, 2,5-xylohydroquinone, 3-butylpyrocatechol, 4 - isopropylpyrocatechol, 2,3 - dihydroxybenzyl alcohol, 3-(2,5-dihydroxy-m-tolyl)-1-propanol, (2,5-dihydroxyphenyl)acetic acid, 4-(3,4-dihydroxyphenyl)butyric acid and the like.

Group (B): 1,7-naphthalenediol, 2,3-naphthalenediol, 1,5 - naphthalenediol, 2,6 - naphthalenediol, 2-methyl-1,7-naphthalenediol, 1-butyl-2,3-naphthalenediol, 1,2,5-naphthalenetriol, 1 - isopropyl - 2,6 - naphthalenediol, 4,6-dihydroxy-3-methyl-1-naphthalenemethanol, 6,7-dihydroxy-2-naphthalenepropanol, 4,8 - dihydroxy-2-naphthaleneacetic acid, 3,7-dihydroxy-alpha-methyl-1-naphthalenepropionic acid, and the like.

Group (C): these flavotannins may be synthetic or naturally occurring, such as those found in plants such as gambier, catechu, quebracho, tizerah, urunday, wattle, mangrove, spruce, hemlock, larch, willow, avarum, Chinese rhubarb, guarana, mahogany, birch, wild cherry, horse chestnut, hottentot fig, ironwood, and teak. A particularly effective flavotannin is quebracho which is obtained from the dried wood or bark, or dried extract of such wood or bark, of the aspidosperma quebracho blanco or the quebracho lorentzi tree. Quebracho is readily available commercially.

Group (D): these gallotannins may be synthetic or naturally occurring, such as sumac tanning and the tannins of valonia oak gall, tea, tara or carabin, valonia fruit cups and beard, myrabolam nuts, divi-divi pods, algarobilla pods, oak wood, bark, and leaves, chestnut wood, bark, and leaves, cloves, dhawa, guarana, mangue takaout, pomegranate, water lily, hornbeam, bistort, guayacan, and cascalote.

Group (E): the so-called mixed tannins include bablah, badan, Cyprus sumace, filao, maletto, and wandoo.

Many formations are preferentially oil wet due to the presence of naturally occurring surface active agents in the reservoir fluids, these agents being adsorbed on the solid surface of formations. Minerals in other formations may exhibit a preferential wettability to the crude oil. Greatly increased oil recovery in a waterflooding operation can be obtained by causing a formation to become preferentially wet by the flood water rather than by the formation crude oil. It has been discovered that this reversal of preferential wettability can be caused by the addition to the flooding water of at least one of the above described additives.

These additives, other than the quinones and compounds H, I and J are oxidizable to a quinoid structure. Quinones, as employed herein, refer to dioxo derivatives of dihydroaromatic systems, the oxygen atoms occupying positions which are ortho or para (or their equivalents in polycyclic compounds) to each other. A most generally applicable procedure for preparing a quinone is to start with a phenol or an amine, introduce either a hydroxyl or an amino group in an ortho or para position, and oxidize the intermediate in acid solution.

The pH of the water flood containing the additive should be greater than 7, preferably in the range of 9 to 12.

In general, the additive is employed in concentrations of 0.1 to 10, preferably 0.5 to 5, weight percent, based on the water employed in the particular volume of flood water which contains the additive. However, even smaller concentrations produce a beneficial result.

It is often quite desirable to include a certain reducing agent or agents which will aid in solubilizing and maintaining the additive in solution. Such reducing agents include alkali metal sulfites, such as sodium sulfite, sodium bisulfite and sodium hydrosulfite, ammonium sulfite, or sulfur dioxide. The reducing agent is employable in an amount in the range of 2 to 50 weight percent, preferably 5 to 20 weight percent, based on the additive.

In accordance with the first embodiment of this invention, a volume of relatively pure water is first introduced into the formation. This water should be as pure as can reasonably be obtained from available water sources. The amount of this first volume of pure water, as well as the four volumes which follow, can vary over a relatively wide range, but generally comprises from 2 to 20 percent of the estimated pore volume of the reservoir being treated. The second volume of water to be introduced has sufficient alkaline material added thereto to provide a pH greater than 7, preferably about 9 to 12. This can be accomplished by the addition of an alkali metal hydroxide or ammonium hydroxide. An alkali metal carbonate can also be employed for this purpose if the reservoir constituents are such as not to react with the carbonate ion. If a reducing agent of the type above described is employed in the third volume of water with the additive, it is desirable to incorporate such a reducing agent in the second water volume. The amount of such reducing agent added to the second volume normally is the same as that added to the third volume or less.

The fourth and fifth volumes which follow the third volume containing the additive are generally the same as the second and first volumes, respectively. These five volumes can then be followed by conventional flood water which is obtained from any convenient source, such as a water well, river, lake or other source which may be available. Conventional flood water often contains various salts such as sodium chloride, calcium chloride and magnesium chloride.

In some operations, the first and fifth volumes of relatively pure water can be omitted. The second and fourth alkaline volumes described above then serve to remove contaminating materials from the adjacent formation water by physical displacement or dissolution. In addition, the alkaline material surrounding the additive tends to prevent the pH of the additive volume from being lowered to an undesired value. If this should happen, the additive may tend to precipitate out from the flood water and cause plugging.

In other operations, the second and fourth volumes of alkaline water can be omitted. The first and fifth pure water volumes described above then serve to remove contaminating materials from the adjacent formation water by physical displacement or dissolution. The pure water surrounding the additive thus tends to prevent metal ions from reacting with the additive.

In order to demonstrate the effectiveness of the waterflooding process of this invention, a simulated oil reservoir was prepared by packing oil-wet sand into a copper tube 60 feet long and having a one-inch diameter. This sand was flooded by a simulated brine which was prepared by dissolving 725.4 grams of sodium chloride, 190.3 grams of calcium chloride and 85.7 grams of $MgCl_2 \cdot 6H_2O$ in sufficient water to give a solution having a volume of 18 liters. This flooding was continued until the water-oil ratio of the effluent from the tube was approximately 100 to 1.

Thereafter, this depleted simulated reservoir was flooded by consecutively introducing five slugs of water into one end of the tube. The size of each of these volumes was approximately five pore volume percent of the simulated reservoir. The first slug was fresh water. The second slug was fresh water having sufficient sodium hydroxide added thereto to provide a pH of 12. The third slug also contained sufficient sodium hydroxide to give a pH of 12. In addition, this third slug contained four weight percent of quebracho and 0.4 weight percent sodium bisulfite. The fourth and fifth slugs were identical to the second and first slugs, respectively. Following these five slugs, the simulated produced reservoir brine was introduced into the tube to complete the flooding operation. It was found that the quebracho-containing slug moved uniformly through the tube.

The second flooding procedure produced 9.7 pore volume percent more oil from the simulated reservoir than was obtained by the initial control run using the simulated reservoir brine as the sole driving liquid. This increase corresponds to the equivalent of an increase of oil recovery of 150 barrels per acre-foot of a corresponding oil-containing reservoir. This is approximately an 85 percent increase over the 175 barrels per acre-foot which can be obtained by conventional waterflooding operations. Thus, the foregoing example clearly demonstrates that the waterflooding procedure of this invention greatly increases the amount of oil that can be recovered from subterranean formations.

While the invention has been described in conjunction with presently preferred embodiments, it should be evident that it is not limited thereto.

What is claimed is:

1. The method of displacing oil from a subterranean formation which comprises injecting into the formation at a selected region thereof in succession (1) a first volume of water substantially free of other materials, (2) a second volume of water having a pH above 7, (3) a third volume of water having a pH above 7 and containing a material selected from the group consisting of:

(A) 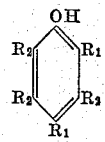

where $R_1$ and $R_2$ are selected from the group consisting of H, OH, R', COOH, $R_3$COOH, $R_3$OH, at least one $R_1$ being OH, R' is an alkyl group having 1 to 4 carbon atoms per molecule, and $R_3$ is an alkylene group having 1 to 3 carbon atoms per molecule, (B) 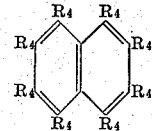

where $R_4$ is selected from the group consisting of H, OH, R', $R_3$OH, COOH, and $R_3$COH, at least two $R_4$'s being OH and said structure being oxidizable to a quinone, (C) flavotannins,
(D) gallotannins,
(E) mixed tannins,
(F) quinhydrone,
(G) p-benzoquinone,
(H) 1-naphthol,
(I) 1,3-naphthalenediol,
(J) phloroglucinol and 2-methylphloroglucinol, (4) a fourth volume of water having a pH above 7, and (5) a fifth volume of water substantially free of other materials.

2. The method of claim 1, further comprising injecting an aqueous flood liquid into said formation following the fifth volume of water.

3. The method of claim 1 wherein each of said second, third and fourth volumes of water also contains a material selected from the group consisting of sulfur dioxide, sodium sulfite, sodium bisulfite and sodium hydrosulfite.

4. The method of claim 1 wherein the pH of each of said second, third and fourth volumes of water is in the range of 9 to 12.

5. The method of claim 1 wherein said material comprises quebracho.

6. The method of claim 5 wherein said third volume of water also contains sodium bisulfite.

7. The method of recovering oil from a subterranean oil-containing formation which comprises injecting into the formation through an input well in succession (1) a first volume of water substantially free of other materials, (2) a second volume of water having a pH above 7, (3) a third volume of water having a pH above 7 and containing a material selected from the group consisting of:

(A) 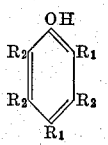

where $R_1$ and $R_2$ are selected from the group consisting of H, OH, R', COOH, $R_3$COOH, $R_3$OH, at least one $R_1$ being OH, R' is an alkyl group having 1 to 4 carbon atoms per molecule, and $R_3$ is an alkylene group having 1 to 3 carbon atoms per molecule, (B) 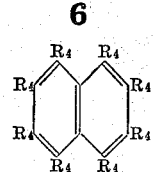

where $R_4$ is selected from the group consisting of H, OH, R', $R_3$OH, COOH and $R_3$COOH, at least two $R_4$'s being OH and said structure being oxidizable to a quinone, (C) flavotannins,
(D) gallotannins,
(E) mixed tannins,
(F) quinhydrone,
(G) p-benzoquinone,
(H) 1-naphthol,
(I) 1,3-naphthalenediol,
(J) phloroglucinol and 2-methylphloroglucinol, (4) a fourth volume of water having a pH above 7, and (5) a fifth volume of water substantially free of other materials, and removing the resulting displaced oil through a producing well in said formation spaced from said input well.

8. The method of displacing oil from a subterranean formation which comprises injecting into the formation at a selected region thereof in succession (1) a first volume of water substantially free of other materials, (2) a second volume of water having a pH above 7 and containing a material selected from the group consisting of:

(A) 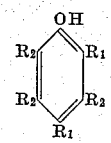

where $R_1$ and $R_2$ are selected from the group consisting of H, OH, R', COOH, $R_3$COOH, $R_3$OH, at least one $R_1$ being OH, R' is an alkyl group having 1 to 4 carbon atoms per molecule, and $R_3$ is an alkylene group having 1 to 3 carbon atoms per molecule, (B) 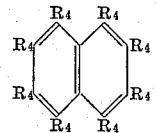

where $R_4$ is selected from the group consisting of H, OH, R', $R_3$OH, COOH, and $R_3$COOH, at least two $R_4$'s being OH and said structure being oxidizable to a quinone, (C) flavotannins,
(D) gallotannins,
(E) mixed tannins,
(F) quinhydrone,
(G) p-benzoquinone,
(H) 1-naphthol,
(I) 1,3-naphthalenediol,
(J) phloroglucinol and 2-methylphloroglucinol, and (3) a third volume of water substantially free of other materials.

9. The method of claim 8, further comprising injecting an aqueous flood liquid into said formation following the third volume of water.

10. The method of claim 8 wherein said second volume of water also contains a material selected from the group consisting of sulfur dioxide, sodium sulfite, sodium bisulfite and sodium hydrosulfite.

11. The method of displacing oil from a subterranean formation which comprises injecting into the formation at a selected region thereof in succession (1) a first volume of water having a pH above 7, (2) a second volume of water having a pH above 7 and containing a material selected from the group consisting of:

(A)

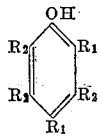

where
R₁ and R₂ are selected from the group consisting of H, OH, R′, COOH, R₃COOH, R₃OH, at least one R₁ being OH,
R′ is an alkyl group having 1 to 4 carbon atoms per molecule, and
R₃ is an alkylene group having 1 to 3 carbon atoms per molecule, (B)

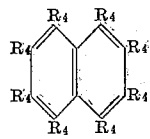

where R₄ is selected from the group consisting of H, OH, R′, R₃OH, COOH, and R₃COOH, at least two R₄'s being OH and said structure being oxidizable to a quinone, (C) flavotannins,
(D) gallotannins,
(E) mixed tannins,
(F) quinhydrone,
(G) p-benzoquinone,
(H) 1-naphthol,
(I) 1,3-naphthalenediol,
(J) phloroglucinol and 2-methylphloroglycinol, and (3) a third volume of water having a pH above 7.

12. The method of claim 11, further comprising injecting an aqueous flood liquid into said formation following the third volume of water.

13. The method of claim 11 wherein said second volume of water also contains a material selected from the group consisting of sulfur dioxide, sodium sulfite, sodium bisulfite and sodium hydrosulfite.

References Cited in the file of this patent
UNITED STATES PATENTS
2,246,726   Garrison _____ June 24, 1941
2,831,022   Van Blaricom _____ Apr. 15, 1958